US012705652B2

(12) United States Patent
Abenov

(10) Patent No.: US 12,705,652 B2
(45) Date of Patent: Aug. 11, 2026

(54) SYSTEM AND METHOD FOR ORGANIZING A SERVICE FOR THE SALE OF GOODS AND SERVICES

(71) Applicant: Marat Rashidovich Abenov, Nur-Sultan (KZ)

(72) Inventor: Marat Rashidovich Abenov, Nur-Sultan (KZ)

( * ) Notice: Subject to any disclaimer, the term of this patent is extended or adjusted under 35 U.S.C. 154(b) by 238 days.

(21) Appl. No.: 18/576,217

(22) PCT Filed: Jul. 5, 2022

(86) PCT No.: PCT/EA2022/050007
§ 371 (c)(1),
(2) Date: Jul. 2, 2024

(87) PCT Pub. No.: WO2023/006166
PCT Pub. Date: Feb. 2, 2023

(65) Prior Publication Data

US 2024/0370910 A1 Nov. 7, 2024

(30) Foreign Application Priority Data

Jul. 26, 2021 (KZ) ................................ 2021/0735.2
Jun. 22, 2022 (KZ) ................................ 2022/0552.2

(51) Int. Cl.
*G06Q 30/00* (2023.01)
*G06Q 20/12* (2012.01)
*G06Q 30/0601* (2023.01)

(52) U.S. Cl.
CPC ......... *G06Q 30/0609* (2013.01); *G06Q 20/12* (2013.01); *G06Q 30/0603* (2013.01)

(58) Field of Classification Search
None
See application file for complete search history.

(56) References Cited

U.S. PATENT DOCUMENTS 6,443,843 B1 * 9/2002 Walker .................. G06Q 20/20 705/16
2004/0093269 A1 5/2004 Rubin et al.
(Continued)

FOREIGN PATENT DOCUMENTS

CN 104239511 A 12/2014
CN 107203388 A 9/2017
(Continued)

OTHER PUBLICATIONS

PCT International Search Report for International Application No. PCT/EA 2022/050007, mailed Oct. 6, 2022, 5pp.
(Continued)

*Primary Examiner* — Mila Airapetian
(74) *Attorney, Agent, or Firm* — The Roy Gross Law Firm, LLC; Roy D. Gross

(57) ABSTRACT

A system and method of organizing the sale service for goods and services randomly, through random determination based on the purchase of certificates for goods and services. A system and method of selling goods and services by drawing a certificate by means of an automated system for selecting and drawing goods and services providing higher sales, without attracting additional human resources to sell more goods and services for the seller, and for the buyer this method of purchasing goods and services makes it possible to purchase goods and services that do not fall under essential goods and services at a cost much lower than the market price.

30 Claims, 9 Drawing Sheets

(56) References Cited

U.S. PATENT DOCUMENTS

Figure 1:
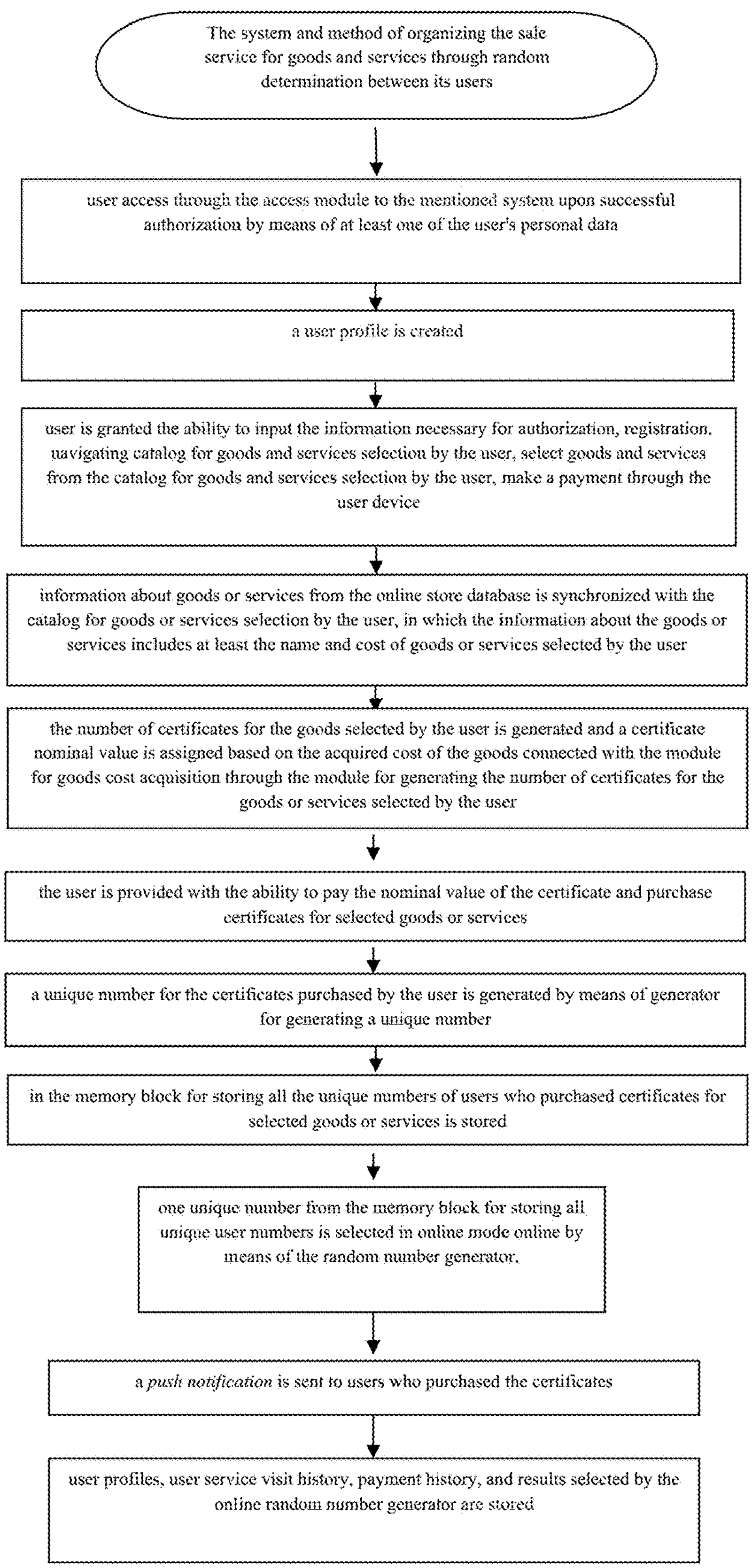

| | | | | |
|---|---|---|---|---|
| 2007/0078716 | A1* | 4/2007 | Tews | G06Q 30/0222 705/14.23 |
| 2008/0228651 | A1 | 9/2008 | Tapsell | |
| 2012/0302311 | A1 | 11/2012 | Luciano, Jr. | |
| 2012/0310718 | A1* | 12/2012 | Ozinga | G06Q 30/0207 705/14.1 |
| 2013/0006856 | A1* | 1/2013 | Aoki | G06Q 40/00 705/41 |
| 2016/0210598 | A1 | 7/2016 | Novick et al. | |
| 2016/0343057 | A1* | 11/2016 | Andon | G06F 16/9535 |
| 2019/0385400 | A1* | 12/2019 | Gotlieb | G06Q 20/342 |

FOREIGN PATENT DOCUMENTS

| | | | |
|---|---|---|---|
| EA | 201291030 | A1 | 8/2013 |
| EA | 201900292 | A1 | 11/2020 |
| KR | 20080011777 | A | 2/2008 |
| KR | 20130056386 | A | 5/2013 |
| KZ | 25345 | A4 | 12/2011 |
| KZ | 31260 | A | 5/2016 |
| RU | 2675910 | C2 | 12/2018 |
| RU | 2017121772 | A | 12/2018 |
| WO | 2016139536 | A1 | 9/2016 |

OTHER PUBLICATIONS

PCT Written Opinion for International Application No. PCT/EA 2022/050007, mailed Oct. 6, 2022, 8pp.

* cited by examiner

SYSTEM AND METHOD FOR ORGANIZING A SERVICE FOR THE SALE OF GOODS AND SERVICES

CROSS REFERENCE TO RELATED APPLICATIONS

This application is a National Phase of PCT Patent Application No. PCT/EA2022/050007 having International filing date of Jul. 5, 2022, which claims the benefit of priority of Kazakstan Application No. 2021/0735.2, filed Jul. 26, 2021 and Kazakstan Application No. 2022/0552.2, filed Jun. 22, 2022, the contents of which are all incorporated herein by reference in their entirety.

The invention relates to the industry of trade, mass purchases, in particular to the system and method of organizing the sale service for goods and services randomly, through random determination based on the purchase of certificates for goods and services. In particular, to the system and method of selling goods and services by drawing a certificate, by means of an automated system for selecting and drawing goods and services providing higher sales, without attracting additional human resources to sell more goods and services for the seller, and for the buyer this method of purchasing goods and services makes it possible to purchase goods and services that do not fall under essential goods and services at a cost much lower than the market price.

From the document RU 2675910 C2, Dec. 17, 2018, a computer-implemented method for automatic calculation and control of parameters for stimulating demand and increasing profits is known. In the method, a commercial enterprise contains a winnings generator, means of displaying the draw progress and issuing winnings, a cash registers that can be connected to a winnings generator, an "optimal Prize-Purchase" system or an "extremely optimal Prize-Purchase" system containing a winnings determination module that determines winnings using a winnings generator, the operation probability of which is set automatically by means of a probability calculator that automatically calculates this probability based on a number of economic parameters, containing a module for registering payments and winnings automatically registering winnings in the current expenses database using a purchase distributor, containing a control module for the two said Prize-Purchase systems automatically controlling the limits of the specified discounts and the condition of their constancy and non-diminution using an irreversibility detector.

From the document EA 201291030 A1, 30.08.2013, an online time-based system of joint contributions for the purchase of goods or services is known; in which said system contains a database that is in contact with two or more remote users via the Internet; moreover, said system allows users to make a contribution in a predetermined amount on account of the specified amount of the target contribution.

The disadvantage of said methods and systems is that their participants are deprived of the opportunity to place bets themselves and influence the results of the draw because each participant's bets are actually predetermined by a unique combination of information elements of the purchased goods and services and the results of the draw completely depend on the actions of the sales organizer. This disadvantage reduces the interest of potential participants in such systems.

From the document RU 2017121772 A, 20.12.2018, a method of preparing and conducting the goods and service draw is known which consists in the distribution of numbered cards bearing the information data block, the goods and service draw according to the random numbers law within the specified time, the goods and service delivery characterized in that a web-site and/or an application for mobile devices based on Android or ios or any other is formed, on the web-site and/or in the application the information is placed on the offered goods for a fixed price and on the terms of participation in the goods or service draw, an electronic database of numbers participating in the draw is created, N amount of the numbered cards for the draw participants is issued, on the card the information is placed on the requirement and rules for registration on the web-site in order to participate in the draw, on the cards promotional information is placed about the partner store with which an agreement is concluded on the deduction percent of purchase made by the card holder, a database of number holders data is created by means of submitting the specified personal data during the registration process on the draw web-site with the indication of the amount of points accrued for the purchase with the partner store and assigning every single point with a single running sequential number participating in the draw, the information on the purchase sum and the card number is forwarded from the partner store to the number data database holder, the running sequential numbers assigned to a card holder according to the amount of points for the purchase with the partner store are registered in the electronic number database, in case of the direct points purchase from the web-site through electronic payment the assignation of running sequential numbers to the draw participant is conducted based on the amount of the purchased points and the participant's data is registered in the number database, the draw participant is informed of the assigned numbers via e-mail or push, the information on the full goods or service price being reached, the deposit reception termination, number of participants, and time of the draw conduction is placed on the web-site and/or in the application, the draw is conducted live, the winning ticket holder is informed, the goods or service is delivered along with the documentation.

Despite the technical attractiveness of the indicated method, there remains the problem of their practical implementation in the prototype, from the point of view of the principles underlying the drawing of the goods and services purchase, the prototype is similar to the Sportloto lottery and, thus, has the same fundamental disadvantages.

From the document EA201900292 A1, 30.11.2020, an operative automated system for trade and prize draw with the instant prize acquisition and instant advertisement of the draw results is known containing a retail server and at least one retail point-of-sale terminal the inlet-outlet of which is connected to the first inlet-outlet of the retail server characterized in that at least one prize delivery counter is introduced the inlet-outlet of the control unit of which is connected to the second inlet-outlet of the retail server and which is immediately situated on the customer's way after at least one retail point-of-sale terminal, and a promotional monitor-stand the control unit of which is connected to the third inlet-outlet of the retail server and which is immediately situated on the customer's way before at least one retail point-of-sale terminal.

The disadvantage of this analogue is the limited function of the system application and the lack of a technical means range that can be used to organize and improve the efficiency of trading enterprises.

From the invention Patent of the Republic of Kazakhstan No31260, G06Q 30/00 (2012.01), a method is known according to which a method of goods and services sale includes the creation of a database in which the goods and services providers data is registered, a program for the use of database and registration of customers for the goods or services is created and connected to the Internet, moreover, depending on the price of the purchased goods and services or services a discount is granted to a customer and in the case of customer's attracting a new client for the purchase of goods or services the customer is granted a compensation the size of which depends on the payment sum for the goods and services or services made by the clients, according to the invention, for the sale of goods or services a referral system is used in which a customer by means of distributing information in the Internet is attracting other clients by recommending them to get registered in the database and to purchase the goods or services with the representative selling these goods or services who discloses the terms of sale and the list of goods and rendered services, upon the need of purchase the customer or the client registered under the customer's recommendation selects the desired product or service from the list and directs a message on the readiness to make a purchase after which the representative refers the specialist for delivery of the goods and services or rendering of services to the customer or client or refers the customer or client to the specialist for the receipt of the goods and services or services and the customer or client makes a payment for the goods or services, moreover the customer is awarded a compensation for the goods or services paid for by a client attracted by them which is used for paying for goods and services of the representative or getting privileges for the perspective purchases.

The disadvantage of this method is that the seller loses funds from the sale of goods/services by paying additional bonuses and granting discounts to buyers.

There is also a method of building a business and selling goods or services in multilevel network marketing according to the innovation patent of the Republic of Kazakhstan N°25345, G06Q 30/00, G06Q 90/00, according to which the invention relates to methods of distributing goods and services, as well as building a business based on network marketing.

The technical result-simplification of the method, the ability to implement it on a mass scale, the expansion of the range of distributed goods and services and the broadening of the technical capabilities—is achieved through the fact that in the method of building a business and selling goods or services in multilevel network marketing consisting of purchase of goods by company for consumption and/or sale to its customers simultaneously with working on turning customers into partners and/or permanent consumers with granting discounts and remuneration accounting with its growth under the established scale in accordance with the sales volume and the increase of partners and customers number which is provided through regular partners meetings and seminars with the participation of sponsors with the customers on the marketing plan with informing the participants of seminars and meetings of the goods and services advantages, and the partner is using acquired experience for forming levels according to said marketing, according to the invention, a database is created for registering data on partners, customers and purchased, consumed, and sold goods volume, and a Client program is created which is available for joining through customer's purchasing company's goods for a specified minimum sum and being assigned an identification number which is used for registration in the database via data input device, consumer turned participant of the Client program signs in to the web-site profile and is granted the right to by the goods with a discount. The Client program participant attracts new customers to purchase the company's goods, who form the first level of network marketing. The participant who attracted new customers acquires the status of a Sponsor and receives remuneration from the turnover carried out by the clients he attracted. In order to receive remuneration, a minimum limit is set on the amount for which it is necessary to purchase products for a certain period of time. First-level customers attract new customers to purchase the company's products, while new customers form the second level of network marketing.

The disadvantage of this method is the attraction of a large number of sellers, and as a result, a significant increase in the cost of goods sold.

The objective of the invention is to develop a system and a method for selling goods or services using a mobile user device with a mobile application, in which a potential seller will be able to sell more goods and services without involving additional human resources.

The method and system according to the invention solves the technical result of expanding the range of technical solutions related to methods and devices for the sale of goods and online sales. The technical result is also an expansion of the functionality of the online store technical capabilities, an increase in the sale of goods and services that do not fall under essential goods and services. The proposed method and system, unlike the standard purchase of goods and services, makes it possible to purchase goods or services for a price much lower than the market value, equal to the certificate nominal value and monitor the drawing of goods or services in real time from any location. The proposed solution is also aimed at automating sales, increasing the reliability and accuracy of user data involved in the random sale of goods or services.

The claimed technical result is achieved through the fact that a system for organizing the sale service for goods and services through random determination between its users is provided, containing:

- an access module that provides the user with access to the mentioned system upon successful authorization by means of at least one of the user's personal data;
- a user profile creation module connected with the access module;
- a payment module connected with the user profile creation module;
- a catalog for the goods or services selection by the user;
- a user device with a controller connected with the access module and the profile creation module, in which the user device is designed for user inputting the information necessary for authorization, registration, navigating the catalog for goods or services selection by the user, selection of goods or services from the catalog by the user, making a payment;

moreover, the system additionally contains:

- a module for synchronizing information about goods or services from the database of an online store with the catalog for goods or services selection by the user, in which the information about the product includes at least the name and cost of goods or services selected by the user,
- a module for generating the number of certificates for the goods or services selected by the user and assigning a nominal value for the certificate based on the cost of the goods connected with the catalog for goods and services selection by the user, a certificate purchase module connected with the payment module and made with the possibility of payment by means of the certificate nominal value payment module and the purchase of the certificate by the user for the goods or services selected by the user, a generator for generating a unique number for the certificate purchased by the user connected with the certificate purchase module, a memory unit for storing all the unique numbers of users who purchased a certificate for selected goods or services, connected with the generator for generating a unique number for the certificate purchased by the user, an online random number generator made with the ability to select one unique number from the memory unit for storing all the unique user numbers, a notification sending module made with the ability to send push notifications to the user who purchased the certificate connected with the user profile creation module, a data server connected with the user profile creation module, the payment module, and the notification sending module, in which the data server is designed to store user profiles, the service user visit history, payment history, and results selected by an online random number generator.

According to one embodiment of the system for organizing the sale service for goods and services through random determination between its users, the notification sending module is designed with the ability to inform the user by sending an email and a push message to their mobile device;

According to one embodiment of the system for organizing the sale service for goods and services through random determination between its users, the notification sending module is designed with the ability to access the user's mobile number from a user device.

According to one embodiment of the system for organizing the sale service for goods and services through random determination between its users, the access module provides the user with access to the mentioned system upon successful authorization by at least a mobile number or e-mail.

According to one embodiment of the system for organizing the sale service for goods and services through random determination between its users, the user device is a mobile device.

According to one embodiment of the system for organizing the sale service for goods and services through random determination between its users, a unique number consists of numbers and letters.

According to one embodiment of the system for organizing the sale service for goods and services through random determination between its users, the notification sending module is designed with the ability to send a push notification to the one user whose unique number from the memory unit for storing all unique user numbers was selected by the online random number generator.

According to one embodiment of the system for organizing the sale service for goods and services through random determination between its users, it contains a QR code generation module based on the selected one unique number from the memory unit for storing all unique user numbers connected with the user profile creation module, in which the QR code generation module is made with the ability to give access to QR code generation to the user whose unique number from the memory unit for storing all unique user numbers was selected by the online random number generator.

According to one embodiment of the system for organizing the sale service for goods and services through random determination between its users, it additionally contains a QR code reader module that is generated by a QR code generation module, in which the QR code reader module is made with the ability to compare and verify the validity of data stored in the data server.

According to one embodiment of the system for organizing the sale service for goods and services through random determination between its users, the system has a timer connected with the online random number generator and the notification sending module to control the time of sale of goods or services.

According to one embodiment of the system for organizing the sale service for goods and services through random determination between its users, the payment module is connected to the EPAY online payment transaction gateway or an analog, and is also made with the ability to automatically make a payment through the nominal payment module for a given number of certificates and the purchase of certificates by the user for the goods or services selected by the user.

According to one embodiment of the system for organizing the sale service for goods and services through random determination between its users, the payment module is made with the ability to replenish the balance of the online wallet connected with the user profile creation module.

According to one embodiment of the system for organizing the sale service for goods and services through random determination between its users, the system is implemented in the REST architectural style with the ability to change settings on the user's side at any time without affecting the operation of the system, in which different users get to the same REST endpoints with the ability to perform the same actions and get the same responses from the system.

According to one embodiment of the system for organizing the sale service for goods and services through random determination between its users, the data server is designed with the ability to store all information modularly and separately.

According to one embodiment of the system for organizing the sale service for goods and services through random determination between its users, the system modules interact asynchronously through the use of the RabbitMQ message broker, in which the server implements the concept of event-receiving nodes (exchanges)—they route data to different queues of RabbitMQ messages.

According to one embodiment of the system for organizing the sale service for goods and services through random determination between its users, the GridFS MongoDB file storage is used to store and extract data from the data server with the ability to store divide data into fragment and save each data fragment separately.

The claimed technical solution also refers to a method of organizing the sale service for goods and services through random determination between its users using a system in which:

access is provided to the user through the access module and the user is provided with access to the mentioned system upon successful authorization by means of at least one of the user's personal data;

a user profile is created through the user profile creation module connected with the access module;

a payment is made, goods and services are selected from the catalog for goods and services selection by the user;

user is granted the ability to input the information necessary for authorization, registration, navigating at least one online store database, select goods and services from the online store database, make a payment through the user device with a controller connected with access module and the user profile creation module, moreover, also:

information about goods or services from the online store database is synchronized with the catalog for goods or services selection by the user, in which the information about the goods or services includes at least the name and cost of goods or services selected by the user, the number of certificates for the goods or services selected by the user is generated and a certificate nominal value is assigned based on the cost of the goods, connected with the catalog for goods or services selection by the user through the module for generating the number of certificates for the goods or services selected by the user, the user is provided with the ability to pay the nominal value of the certificate and purchase a certificate for selected goods and services, a unique number for the certificate purchased by the user is generated by means of generator for generating a unique number, in the memory unit for storing all the unique numbers of users who purchased a certificate for selected goods and services is stored, one unique number from the memory unit for storing all unique user numbers is selected in online mode online by means of the random number generator, a push notification is sent to users who purchased the certificate, user profiles, user service visit history, payment history, and results selected by the online random number generator are stored.

According to one embodiment of the method of selling goods and services by random determination between its users, through the notification sending module, the user is informed by sending an email and/or SMS to their mobile number.

According to one embodiment of the method of selling goods and services by random determination between its users, access to the user's mobile number is obtained from a user device.

According to one embodiment of the method of selling goods and services by random determination between its users, the the user is granted with access to the mentioned system upon successful authorization by at least a mobile number or e-mail.

According to one embodiment of the method of selling goods and services by random determination between its users, a mobile device is used as a user device.

According to one embodiment of the method of selling goods and services through random determination between its users, a number consisting of numbers and letters is assigned as a unique certificate number.

According to one embodiment of the method of selling goods and services by random determination between its users, a push notification is sent to the one user whose unique number from the memory unit for storing all unique user numbers was selected by the online random number generator via the notification sending module.

According to one embodiment of the method of selling goods and services by random determination between its users, access to the generation of a QR code is provided to a user whose unique number from the memory unit for storing all unique user numbers was selected by the online random number generator via the QR code generation module connected with the user profile creation module.

According to one embodiment of the method of selling goods and services by random determination between its users, the validity of the QR code is compared and verified with the data stored in the data server by means of the QR code reader module.

According to one embodiment of the method of selling goods and services by random determination between its users, a timer connected with the online random number generator and the notification sending module is used and the time of sale of goods or services is controlled.

According to one embodiment of the method of selling goods and services by random determination between its users, payments are made through the EPAY online payment transaction gateway or its analogues, in which through the payment module the nominal value is automatically paid for a given number of certificates and certificates are purchased for the goods or services selected by the user.

According to one embodiment of the method of selling goods and services by random determination between its users, the balance of the online wallet connected with the user profile creation module is replenished.

According to one embodiment of the method of selling goods and services by random determination between its users, through the REST architectural style, settings on the user's side are changed at any time without affecting the system's operation, in which different users get to the same REST endpoints with the ability to perform the same actions and get the same responses from the system.

According to one embodiment of the method of selling goods and services by random determination between its users, all information is stored in the data server modularly and separately.

According to one embodiment of the method of selling goods and services by random determination between its users, the system modules interact asynchronously through the use of the RabbitMQ message broker, in which withing the server the concept of event-receiving nodes (exchanges) is realized which route data to different queues of RabbitMQ messages.

According to one embodiment of the method of selling goods and services by random determination between its users, data is stored and extracted from the data server within the system by means of the GridFS MongoDB file storage with the ability to store divide data into fragment and save each data fragment separately.

The claimed solution is now explained by the following drawings, where:

FIG. 1. The block schematic diagram of the system and method of organizing the sale service for goods and services through random determination between its users.

Figure 2:
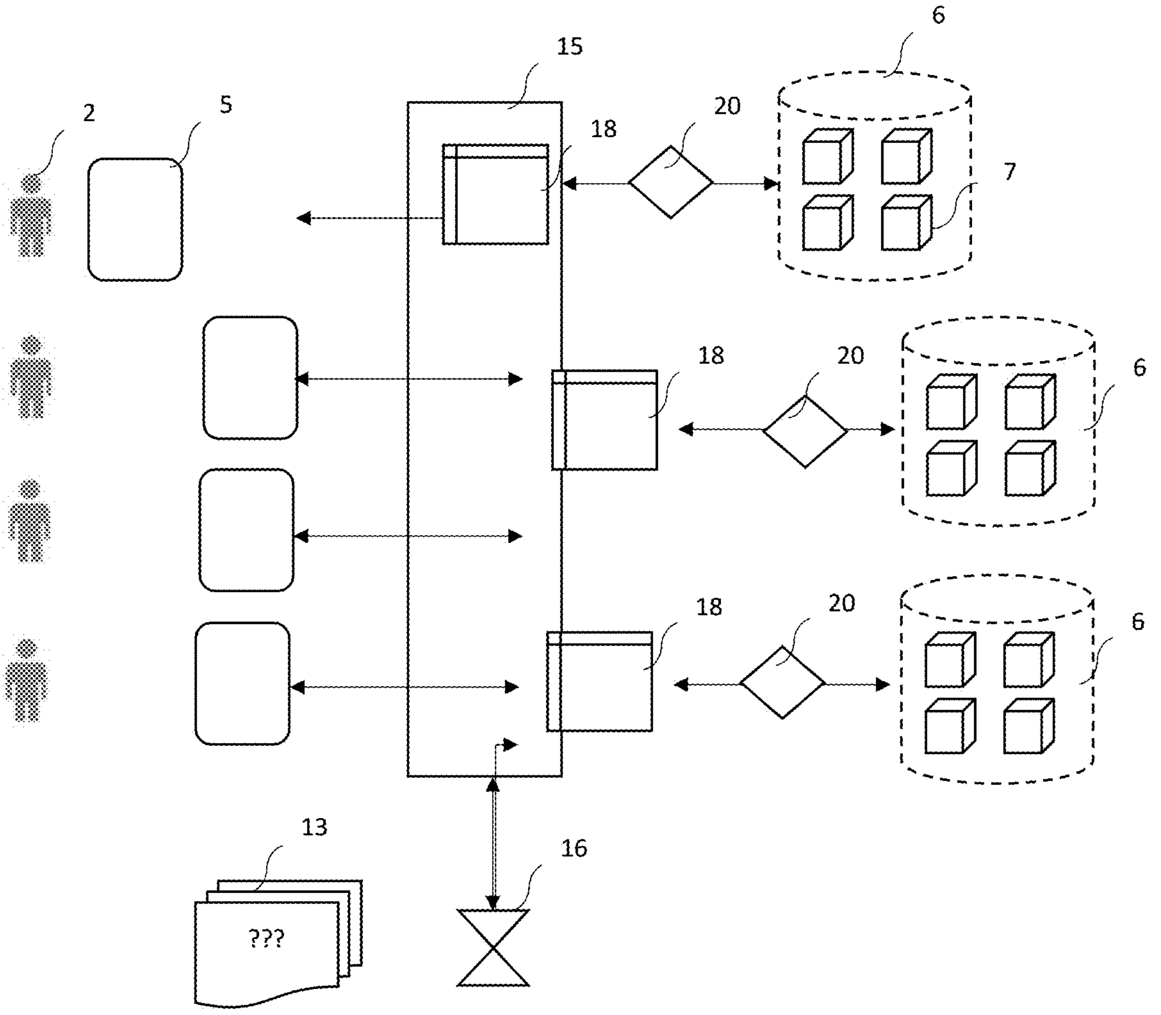

FIG. 2. The schematic diagram of the system for organizing the sale service for goods and services through random determination between its users.

Figure 3:
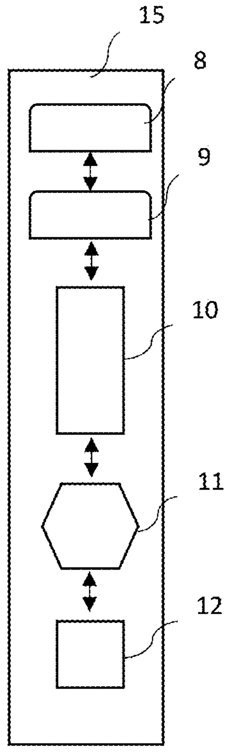

FIG. 3. The schematic diagram of the data server of the system for organizing the sale service for goods and services through random determination between its users.

Figure 4:
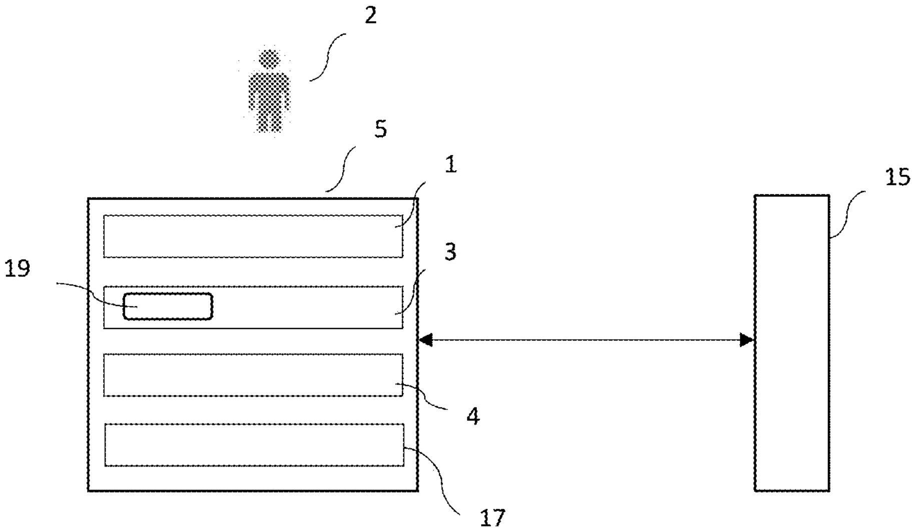

FIG. 4. The schematic diagram of the user device of the system for organizing the sale service for goods and services through random determination between its users.

Figure 5:
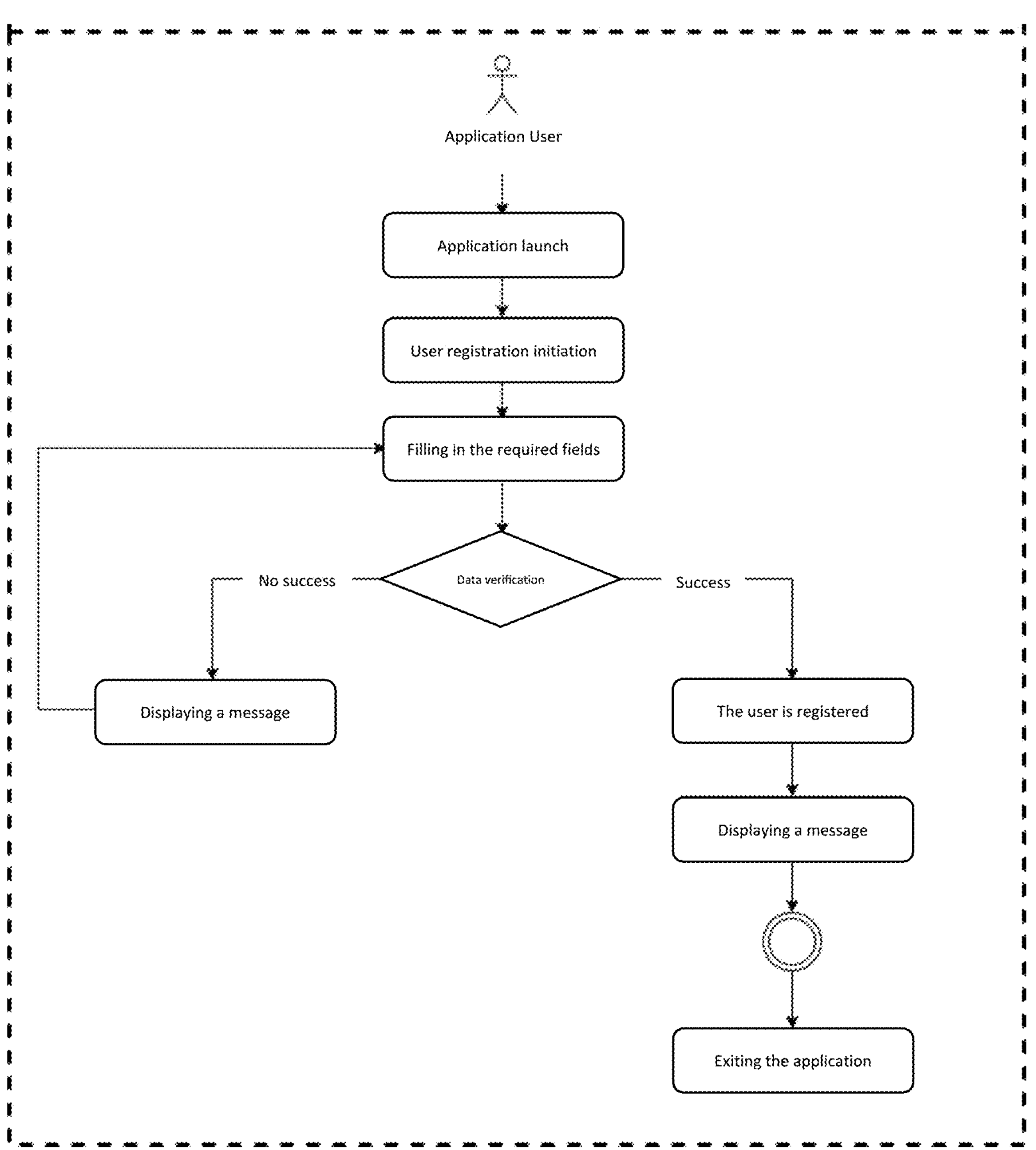

FIG. 5. Illustrative view of the block diagram of user registration in the system.

Figure 6:
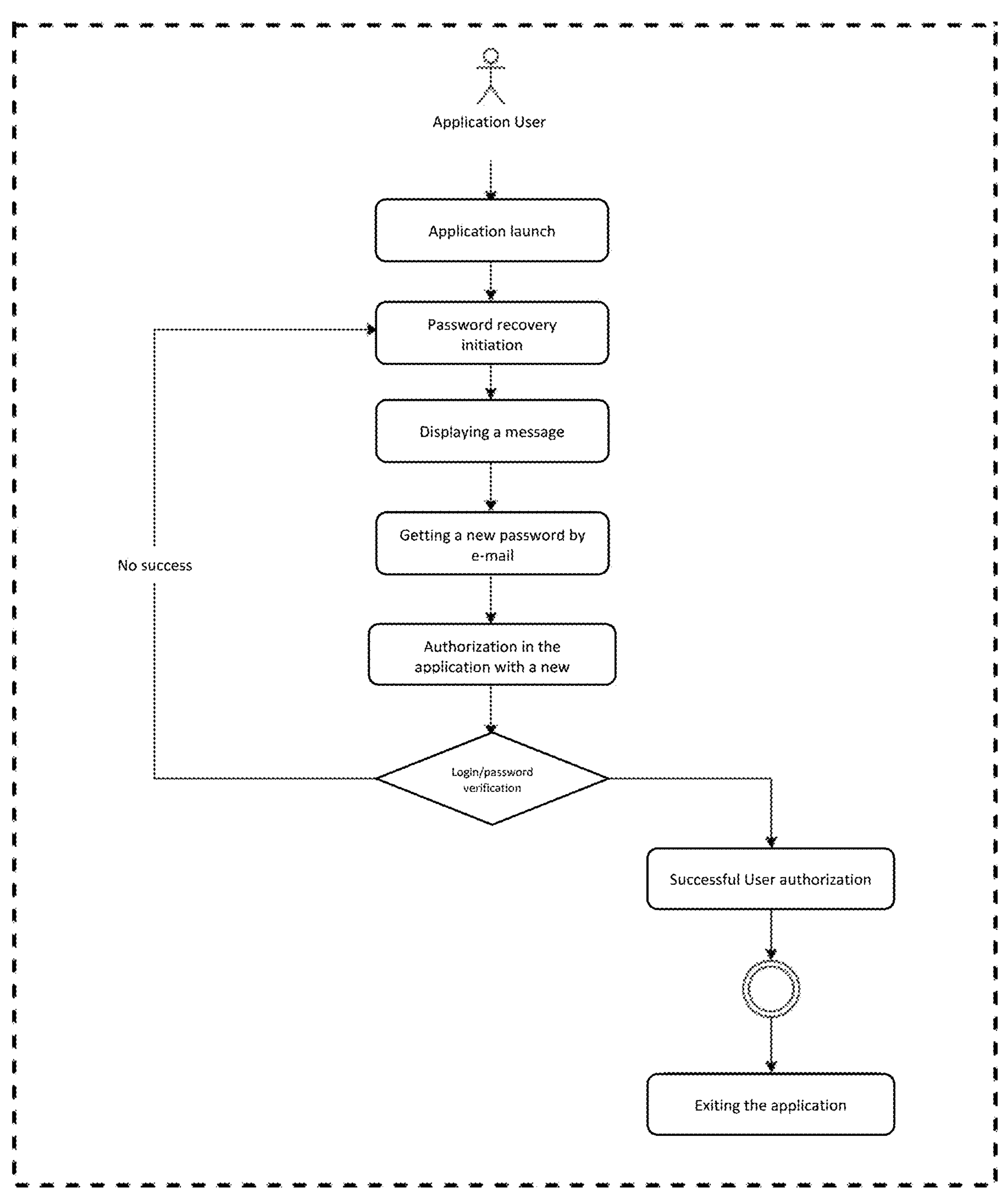
Figure 7:
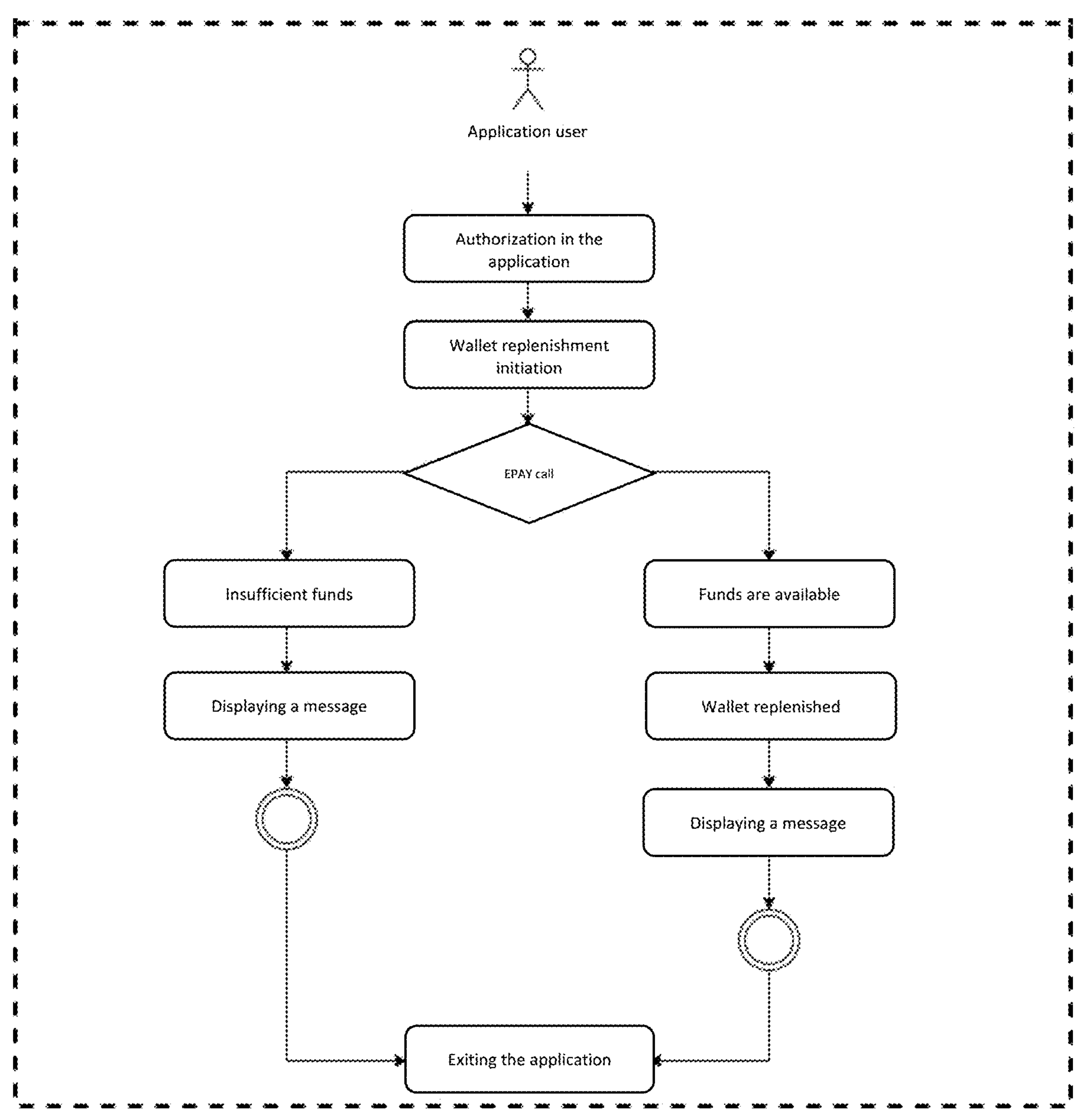
Figure 8:
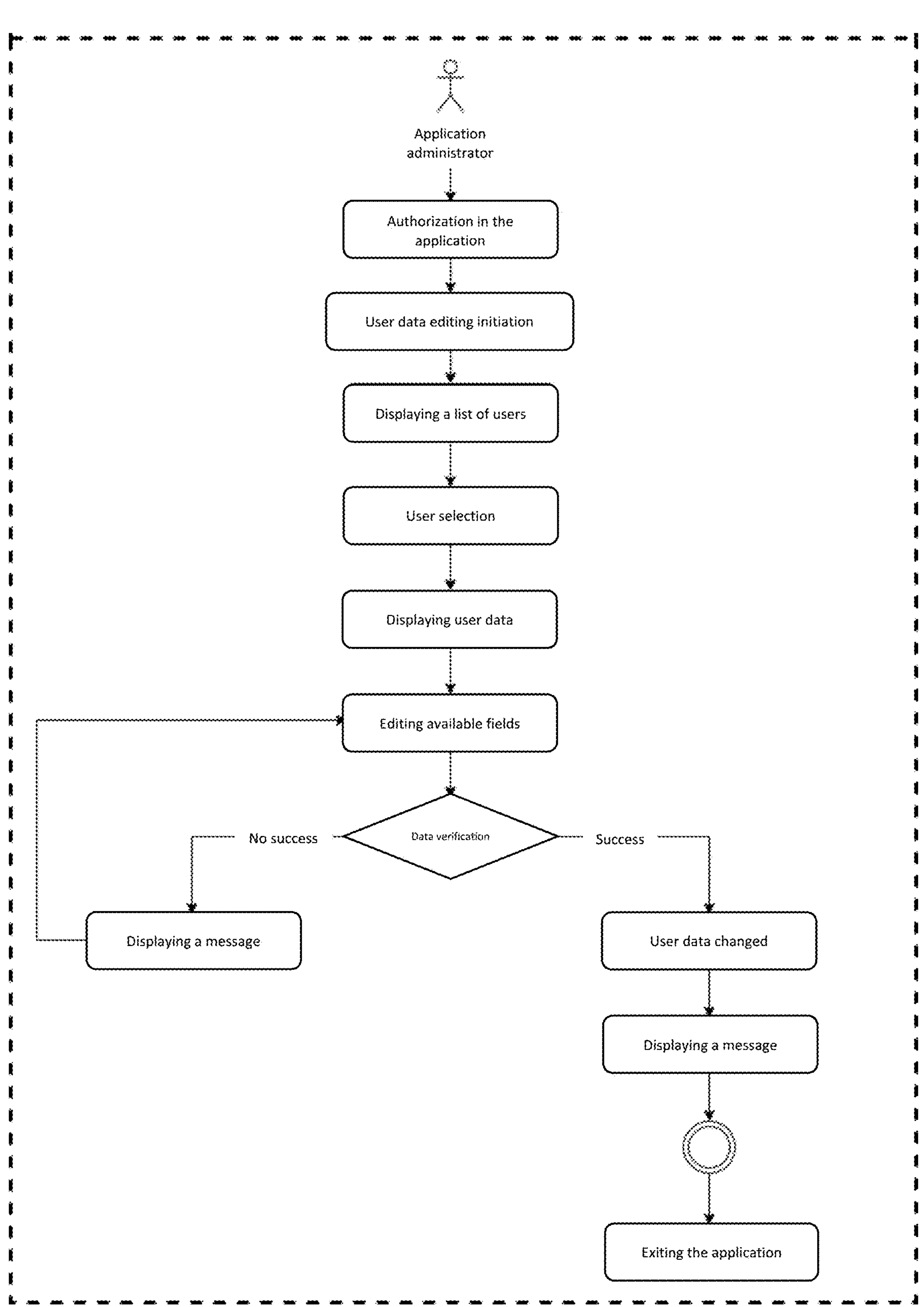

FIG. 6. Illustrative view of the block diagram for restoring user access to the system FIG. 7. Illustrative view of the block diagram for replenishing the user's online wallet FIG. 8. Illustrative view of the block diagram of the system user administration.

Figure 9:
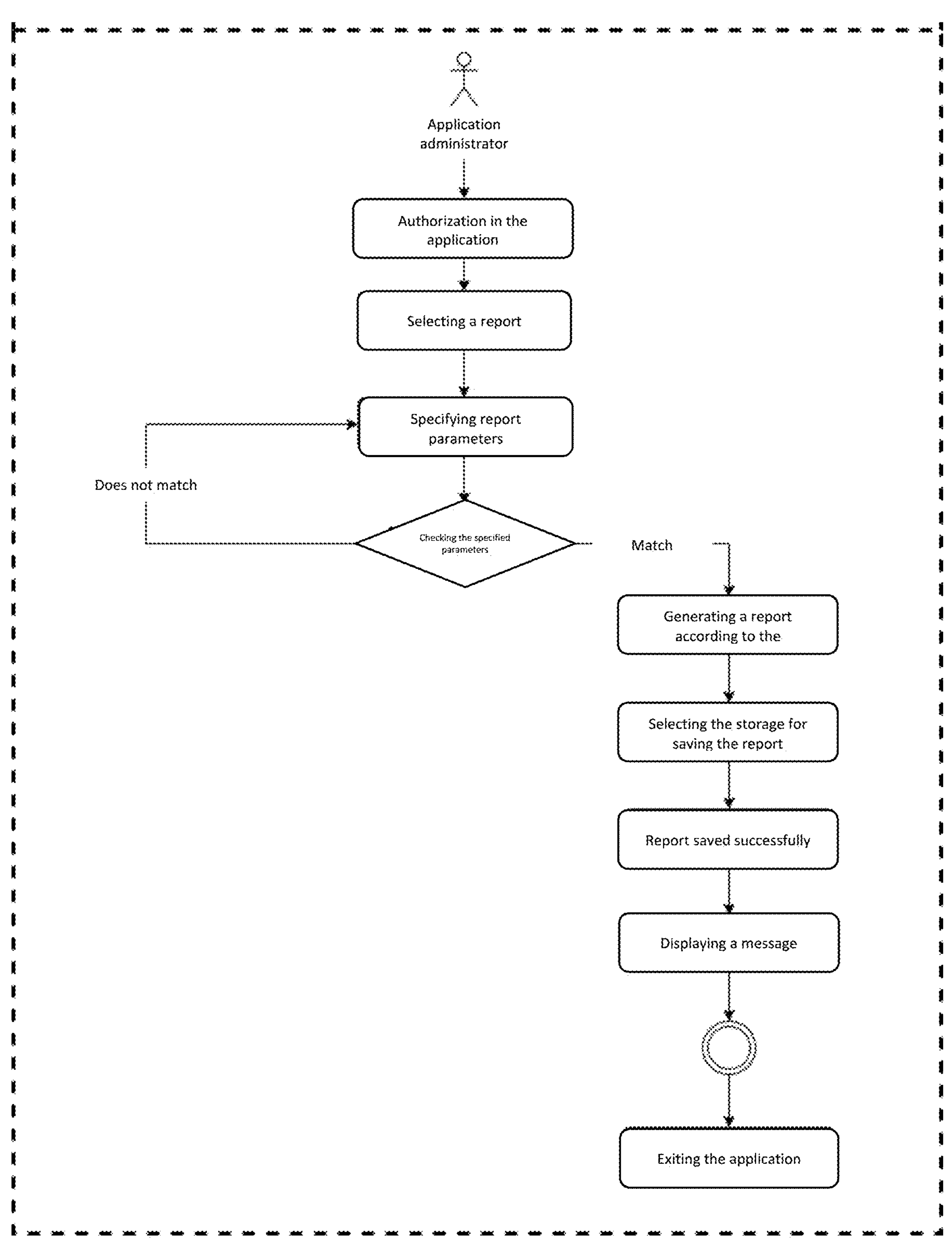

FIG. 9. Illustrative view of the block diagram for generating system usage statistics.

Figure 10:
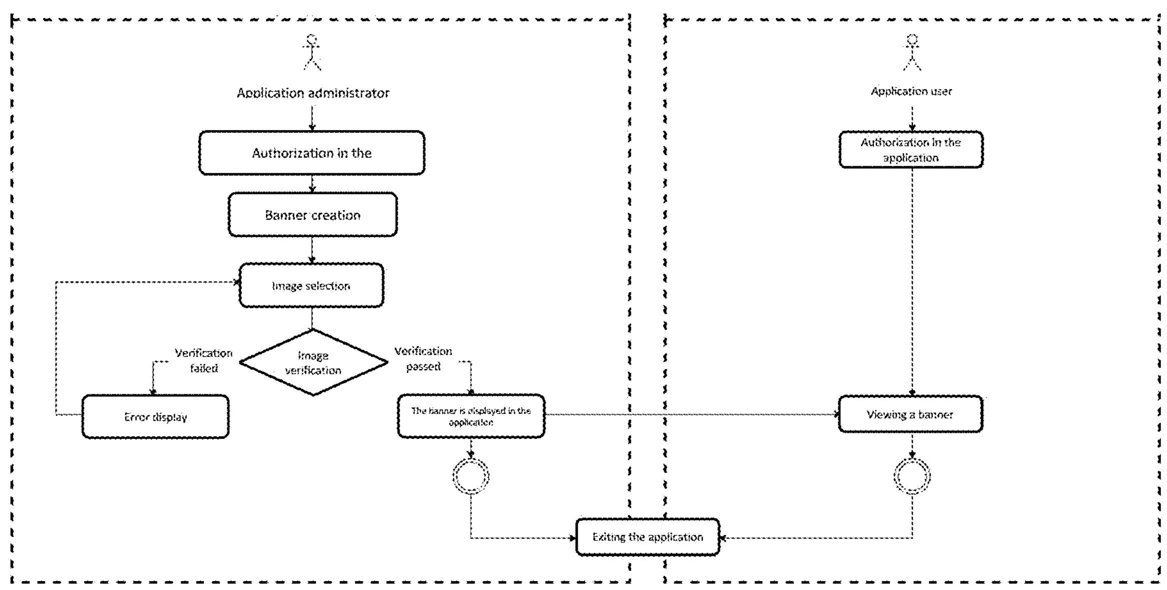

FIG. 10. Illustrative view of the block diagram for creating and viewing banners in the system.

REFERENCES MADE TO THE FIGURES

1-access module providing user access,
2-user,
3-user profile creation module,
4-payment module,
5 user device,
6-online store database,
7-goods or service,
8-module for obtaining the cost of goods and service,
9-module for generating the number of certificates,
10 certificate purchase module,
11-generator for generating a unique number,
12-memory unit,
13-online random number generator,
14-notification sending module,
15 data server,
16-timer,
17-user's online wallet,
18-catalog for goods or services selection by the user;
19-QR code generation module,
20 synchronization module.

In general, the purpose and stated objective of the system and the method of organizing the sale service for goods and services through random determination between its users is achieved through the fact that the a potential customer registers in the application with the specification of their own personal data, after the registration is complete the potential customer is granted the ability to choose the category of goods in the respective menu section and upon choosing the goods and service the potential customer purchases the certificate(s), via any of the country's payment systems, of the specified nominal value, for the ability to take part in a draw which takes place no later than a week after the purchase of the certificate by the potential customer, after that a draw of goods or services is conducted by means of an online random number generator, moreover, in this application the total number of certificates sold and taking part in the draw of the selected goods and service or service is displayed in percentage terms and after one hundred percent of the certificates is sold the system automatically conducts a message send-out to all the participants on the prospective draw with the specification of time and date of the event, moreover, only the certificated purchased for the drawn goods or service are participating in the draw; based on the results of the draw a win notification with a QR code is sent to the winning certificate holder's mobile application with which the customer refers to the address specified in the seller mobile application and their goods or service is delivered to them for the nominal value of the certificate instead of the actual price.

Example. A potential customer wants to purchase a product worth 100,000 tenge. To do this, they install the online store mobile application on their phone, select any desired product category from the catalog: household appliances, vehicles, real estate, etc., then they select the goods and, instead of paying for the goods, they purchase a certificate of the 1,000 tenge nominal value with an individual number. To increase the probability of winning the selected goods, the customer may purchase several certificates which are automatically registered in the online store database and in the mobile application. Within the time window no longer than 1 week, the seller conducts an online draw of which all holders of certificates for the selected goods and service are notified in advance. The winning certificate holder receives the goods worth 100,000 tenge not for the actual price, but for the cost of the certificate. In case of loss, the certificates purchased by the customer are nullified.

The proposed method allows the seller to increase sales of goods and services, and the consumer to satisfy their emotions. This method of sale does not apply to essential goods and services, however, it satisfies the demand for goods and services that are not considered essential, but are desirable and unavailable to the consumer due to their high market value.

In general, when implementing the method of organizing the sale service for goods and services through random determination between its users, a potential customer installs the online store application on a mobile device, selects the goods or service offered by the online store in the application, then purchases the certificate(s) for it which has its own unique number which is subsequently drawn via an online random number generator, and in case of a win, the consumer receives the goods not for the actual price, but for the certificate nominal value. In the stated method, each of the consumers and/or clients can participate in the draw of a certificate when buying goods and service, which satisfies not only the demand for the purchase itself, but also the emotions associated with the expectation and anticipation of success. The proposed method and system, in contrast to the conventional purchase of goods and services, makes it possible to purchase goods for a price much lower than the market value equal to the certificate nominal value and monitor the draw of goods and service in real time from any location using Internet sources.

According to FIGS. 1-10, the system for organizing the sale service for goods and services through random determination between its users consists of:

- an access module (1) that provides the user (2) with access to the mentioned system upon successful authorization by means of at least one of the user's (2) personal data;
- a user profile creation module (3) connected with the access module (1);
- a payment module (4) connected with the user profile creation module (3);
- a catalog for goods or services selection (18) by the user;
- a user device (5) with a controller connected with the access module (1) and the profile creation module (3), in which the user device (5) is designed for user inputting the information necessary for authorization, registration, navigating the catalog (18) for goods or services selection by the user, selection of goods or services from the catalog (18) by the user, making a payment;
- a module for synchronizing (20) information about goods or services from the database of an online store (6) with the catalog (18) for goods or services selection by the user, in which the information about the product includes at least the name and cost of goods or services (7) selected by the user (2),
- a module for generating the number of certificates (9) for the goods or services (7) selected by the user (2) and assigning a nominal value for the certificate based on the cost of the goods or services connected with the catalog (18) for goods and services selection by the user, a certificate purchase module (10) connected with the payment module (4) and made with the possibility of payment by means of the certificate nominal value payment module (4) and the purchase of the certificate by the user (2) for the goods or services (7) selected by the user, a generator for generating a unique number (11) for the certificate purchased by the user connected with the certificate purchase module (10), a memory unit (12) for storing all the unique numbers of users who purchased a certificate for selected goods or services, connected with the generator for generating a unique number (11) for the certificate purchased by the user, an online random number generator (13) made with the ability to select one unique number from the memory unit (12) for storing all the unique user numbers, a notification sending module (14) made with the ability to send push notifications to the user who purchased the certificate connected with the user profile creation module (3), a data server (15) connected with the user profile creation module (3), the payment module (4), and the notification sending module (14), in which the data server (15) is designed to store user profiles, the service user visit history, payment history, and results selected by an online random number generator (13).

According to one embodiment of the system for organizing the sale service for goods and services through random determination between its users, the notification sending module (14) is designed with the ability to inform the user (2) by sending an email and a push message to their user device (5).

According to one embodiment of the system for organizing the sale service for goods and services through random determination between its users, the notification sending module (14) is designed with the ability to access the user's mobile number from a user device (5).

According to one embodiment of the system for organizing the sale service for goods and services through random determination between its users, the access module (1) provides the user with access to the mentioned system upon successful authorization by at least a mobile number or e-mail.

According to one embodiment of the system for organizing the sale service for goods and services through random determination between its users, the user device (5) is a mobile device.

According to one embodiment of the system for organizing the sale service for goods and services through random determination between its users, a unique number consists of numbers and letters.

According to one embodiment of the system for organizing the sale service for goods and services through random determination between its users, the notification sending module (14) is designed with the ability to send a push notification to the one user whose unique number from the memory unit (12) for storing all unique user numbers was selected by the online random number generator (13).

According to one embodiment of the system for organizing the sale service for goods and services through random determination between its users, it contains a QR code generation module (19) based on the selected one unique number from the memory unit (12) for storing all unique user numbers connected with the user profile creation module (3), in which the QR code generation module (19) is made with the ability to give access to QR code generation to the user (2) whose unique number from the memory unit (12) for storing all unique user numbers was selected by the online random number generator (13).

According to one embodiment of the system for organizing the sale service for goods and services through random determination between its users, it additionally contains a QR code reader module that is generated by a QR code generation module (19), in which the QR code reader module is made with the ability to compare and verify the validity of data stored in the data server (15).

According to one embodiment of the system for organizing the sale service for goods and services through random determination between its users, the system has a timer (16) connected with the online random number generator (13) and the notification sending module (14) to control the time of sale of goods or services (7).

According to one embodiment of the system for organizing the sale service for goods and services through random determination between its users, the payment module (4) is connected to the EPAY online payment transaction gateway or an analog, and is also made with the ability to automatically make a payment through the nominal payment module for a given number of certificates and the purchase of certificates by the user for the goods or services (7) selected by the user (2).

According to one embodiment of the system for organizing the sale service for goods and services through random determination between its users, the payment module (4) is made with the ability to replenish the balance of the online wallet (17) connected with the user (2) profile creation module (3).

According to one embodiment of the system for organizing the sale service for goods and services through random determination between its users, the system is implemented in the REST architectural style with the ability to change settings on the user's side at any time without affecting the operation of the system, in which different users get to the same REST endpoints with the ability to perform the same actions and get the same responses from the system. In the REST architectural style, the client implementation and the server implementation can be performed independently of each other. This indicates that the client-side code can be changed at any time without affecting the server operation, and the server-side code can be changed without affecting the client operation.

Using the REST interface, different clients get to the same REST endpoints, perform the same actions, and receive the same responses.

According to one embodiment of the system for organizing the sale service for goods and services through random determination between its users, the data server (15) is designed with the ability to store all information modularly and separately.

According to one embodiment of the system for organizing the sale service for goods and services through random determination between its users, the system modules interact asynchronously through the use of the RabbitMQ message broker, in which the server implements the concept of event-receiving nodes (exchanges)—they route data to different queues of RabbitMQ messages. The RabbitMQ message broker is used for asynchronous module interaction. The main functionality of RabbitMQ is flexible routing of messages between different event providers and consumers. The solution is not limited to creating a simple data queue between the two parties. The server implements the concept of nodes receiving events (exchanges)—they route data to different RabbitMQ message queues.

According to one embodiment of the system for organizing the sale service for goods and services through random determination between its users, the GridFS MongoDB file storage is used to store and extract data from the data server (15) in the system with the ability to store divide data into fragment and save each data fragment separately. To store and extract a large number of files in the system, the GridFS MongoDB file storage is used. GridFS has the ability to store files larger than its 16 MB document size limit. GridFS splits the file into fragments and stores each data fragment in a separate document each of which has a maximum size of 255 KB.

According to FIGS. 1-10, a method of organizing the sale service for goods and services through random determination between its users using the system according to claim 1 in which:

- access is provided to the user through the access module (1) and the user (2) is provided with access to the mentioned system upon successful authorization by means of at least one of the user's personal data;
- a user profile is created through the user profile creation module (3) connected with the access module;
- a payment is made via the payment module (4)
- goods and services are selected from the catalog (18) for goods and services selection by the user;
- user (2) is granted the ability to input the information necessary for authorization, registration, navigating catalog (18) for goods and services selection by the user, select goods and services from the catalog (18) for goods and services selection by the user, make a payment through the user device (5) with a controller connected with access module (1) and the user profile creation module ( ) moreover
- information about goods or services (7) from the online store database (6) is synchronized with the catalog (18) for goods or services selection by the user, in which the information about the goods or services (7) includes at least the name and cost of goods or services selected by the user (2),
- the number of certificates for the goods or services selected (5) by the user (2) is generated and a certificate nominal value is assigned based on the cost of the goods or services (7), connected with the catalog (18) for goods or services selection by the user through the module for generating the number of certificates (9) for the goods or services selected by the user,
- the user is provided with the ability to pay the nominal value of the certificate and purchase a certificate for selected goods and services,
- a unique number for the certificate purchased by the user is generated by means of the generator for generating a unique number (11),
- in the memory unit (12) for storing all the unique numbers of users who purchased a certificate for selected goods and services (7) is stored,
- one unique number from the memory unit (12) for storing all unique user numbers is selected in online mode online by means of the online random number generator (13),
- a push notification is sent to users who purchased the certificate through the notification sending module (14),
- user profiles, user service visit history, payment history, and the results selected by the online random number generator (13) are stored in the data server (15).

According to one embodiment of the method of organizing the sale service for goods and services through random determination between its users, through the notification sending module (14), the user is informed by sending an email and push message to their user device (5).

According to one embodiment of the method of organizing the sale service for goods and services through random determination between its users, access to the user's mobile number is obtained from a user device (5).

According to one embodiment of the method of organizing the sale service for goods and services through random determination between its users, the the user (2) is granted with access to the mentioned system upon successful authorization by at least a mobile number or e-mail.

According to one embodiment of the method of organizing the sale service for goods and services through random determination between its users, a mobile device is used as a user device (5).

According to one embodiment of the method of organizing the sale service for goods and services through random determination between its users, a number consisting of numbers and letters is assigned as a unique certificate number.

According to one embodiment of the method of organizing the sale service for goods and services through random determination between its users, a push notification is sent to the one user whose unique number from the memory unit (12) for storing all unique user numbers was selected by the online random number generator (13) via the notification sending module (14).

According to one embodiment of the method of organizing the sale service for goods and services through random determination between its users, access to the generation of a QR code is provided to a user whose unique number from the memory unit for storing all unique user numbers was selected by the online random number generator (13) via the QR code generation module (19) connected with the user profile creation module (3).

According to one embodiment of the method of organizing the sale service for goods and services through random determination between its users, the validity of the QR code is compared and verified with the data stored in the data server (15) by means of the QR code reader module.

According to one embodiment of the method of organizing the sale service for goods and services through random determination between its users, a timer (16) connected with the online random number generator (13) and the notification sending module (14) is used and the time of sale of goods or services is controlled.

According to one embodiment of the method of organizing the sale service for goods and services through random determination between its users, payments are made through the EPAY online payment transaction gateway or its analogues, in which through the payment module (4) the nominal value is automatically paid for a given number of certificates and certificates are purchased for the goods or services (7) selected by the user.

According to one embodiment of the method of organizing the sale service for goods and services through random determination between its users, the balance of the online wallet connected with the user profile creation module (3) is replenished.

According to one embodiment of the method of organizing the sale service for goods and services through random determination between its users, through the REST architectural style, settings on the user's side are changed at any time without affecting the system's operation, in which different users get to the same REST endpoints with the ability to perform the same actions and get the same responses from the system.

According to one embodiment of the method of organizing the sale service for goods and services through random determination between its users, all information is stored in the data server (15) modularly and separately.

According to one embodiment of the method of organizing the sale service for goods and services through random determination between its users, the system modules interact asynchronously through the use of the RabbitMQ message broker, in which withing the server the concept of event-receiving nodes (exchanges) is realized which route data to different queues of RabbitMQ messages.

According to one embodiment of the method of organizing the sale service for goods and services through random determination between its users, data is stored and extracted from the data server (15) within the system by means of the GridFS MongoDB file storage with the ability to store divide data into fragment and save each data fragment separately.

According to one embodiment of the method of organizing the sale service for goods and services through random determination between its users, the balance of the online wallet (17) connected with the user profile creation module (3) is replenished.

The invention claimed is:

1. A system for organizing a sale of goods and services through random determination, the system comprising:

an access module that provides a user through the access module, upon successful authorization using at least one of the user's personal data, an access to a system;

a user profile creation module connected with the access module that is configured to create a user profile;

a payment module connected with the user profile creation module that is configured to make a payment;

a catalog for goods or services selection by the user;

a user device with a controller connected with the access module and the profile creation module, in which the user device is configured for user to input the information necessary for authorization, registration, navigating the catalog for goods or services selection by the user, selection of goods or services from the catalog by the user, and making a payment;

further comprising:

a module for synchronizing information about goods or services from the database of an online store with the catalog for goods or services in which the information about the goods or services includes at least the name and cost of goods or services selected by the user;

a certificate generation module for generating certificates for the goods or services selected by the user and assigning the certificate a nominal value based on the price of the goods or services selected by the user;

a certificate purchase module connected with the payment module that provides the ability to pay the nominal value of the certificate and purchase the certificate for the selected goods or services;

a unique number generator for generating a unique number for the certificate purchased by the user;

a memory unit for storing unique user numbers of users who purchased a certificate for the selected goods or services;

a random number generator for selecting the unique number from the certificate from the memory unit for storing all the unique user numbers in online mode;

a notification sending module for sending push notifications to the user who purchased a certificate;

a QR code generation module that provides the user whose unique number was selected by the random number generator through the QR code generation module connected with the user profile creation module, an access to a QR code generator;

a data server connected with the user profile creation module, the payment module, and the notification sending module, in which the data server is configured to store user profiles, user service visit history, payment history, and results selected by an online random number generator.

2. The system of claim 1 wherein the notification sending module is designed with the ability to inform the user by sending an email and a push message to their mobile device.

3. The system of claim 1 wherein the notification sending module is designed with the ability to access the user's mobile number from a user device.

4. The system of claim 1 wherein the access module provides the user with access to the mentioned system upon successful authorization by at least a mobile number or e-mail.

5. The system of claim 1 wherein the user device is a mobile device.

6. The system of claim 1 wherein the unique number consists of numbers and letters.

7. The system of claim 1 wherein the notification sending module is designed with the ability to send a push notification to the one user whose unique number from the memory unit for storing all unique user numbers was selected by the online random number generator.

8. The system of claim 1 wherein it additionally contains a QR code reader module that is generated by a QR code generation module, in which the QR code reader module is made with the ability to compare and verify the validity of data stored in the data server.

9. The system of claim 1 wherein the system has a timer connected with the online random number generator and the notification sending module to control the time of sale of goods or services.

10. The system for of claim 1 wherein the payment module is connected to the EPAY online payment transaction gateway or an analog, and is also made with the ability to automatically make a payment through the nominal payment module for a given number of certificates and the purchase of certificates by the user for the goods or services selected by the user.

11. The system of claim 1 wherein the payment module is made with the ability to replenish the balance of the online wallet connected with the user profile creation module.

12. The system of claim 1 wherein the system is implemented in the REST architectural style with the ability to change settings on the user's side at any time without affecting the operation of the system, in which different users get to the same REST endpoints with the ability to perform the same actions and get the same responses from the system.

13. The system of claim 1 wherein the data server is designed with the ability to store all information modularly and separately.

14. The system of claim 1 wherein the system modules interact asynchronously through the use of the RabbitMQ message broker, in which the server implements the concept of event-receiving nodes (exchanges) to route data to different queues of RabbitMQ messages.

15. The system of claim 1 wherein the GridFS MongoDB file storage is used to store and extract data from the data server with the ability to store divide data into fragment and save each data fragment separately.

16. A method of organizing a sale of goods and services through random determination, the method comprising:

providing a user, through an access module upon successful authorization using at least one of the user's personal data, an access to a system;

creating a user profile through a user profile creation module connected with the access module;

making a payment via a payment module;

selecting, by the user, goods and services from a catalog of goods and services;

granting the user the ability to:

input the information necessary for authorization, registration, and for navigating the catalog for of goods and services, select goods or services from the catalog of goods and services, make a payment by a user device with a controller connected with the access module and the user profile creation module, characterized in that:

information about goods and services from an online store database is synchronized with the catalog for of goods and services, in which the information about the goods and services includes at least a name and a price of goods or services selected by the user;

generating, by a certificate generation module, certificates for the goods or services and assigning the certificate a nominal value based on the cost price of the goods or services selected by the user;

providing the user with the ability to pay the nominal value of the certificate and purchase the certificate for selected goods or services;

generating, by unique number generator, a unique number for the certificate purchased by the user;

storing, in the memory unit, unique user numbers of users who purchased a certificate for the selected goods and or services;

selecting, by a random number generator, the unique number for the certificate from the memory unit for storing unique user numbers in online mode;

sending, by the notification sending module, a push notification to users, who purchased a certificate;

through the notification sending module, providing the user, whose unique number was selected by an online random number generator through a QR code generation module connected with the user profile creation module, and access to a QR code generator;

storing user profiles, user service visit history and the goods or services selected by the user, payment history, and results selected by the online random number generator.

17. The method of claim 15 wherein through the notification sending module, the user is informed by sending an email and push message to their user device.

18. The method of claim 15 wherein the access to the user's mobile number is obtained from a user device.

19. The method of claim 15 wherein the user is granted with access to the mentioned system upon successful authorization by at least a mobile number or e-mail.

20. The method of claim 15 wherein a mobile device is used as a user device.

21. The method of claim 15 wherein a number consisting of numbers and letters is assigned as a unique certificate number.

22. The method of claim 15 wherein a push notification is sent to the one user whose unique number from the memory unit for storing all unique user numbers was selected by the online random number generator via the notification sending module.

23. The method of claim 15 wherein the validity of the QR code is compared and verified with the data stored in the data server by means of the QR code reader module.

24. The method of claim 15 wherein a timer connected with the online random number generator and the notification sending module is used and the time of sale of goods or services is controlled.

25. The method of claim 15 wherein payments are made through the EPAY online payment transaction gateway or its analogues, in which through the payment module the nominal value is automatically paid for a given number of certificates and certificates are purchased for the goods or services selected by the user.

26. The method of claim 15 wherein the balance of the online wallet connected with the user profile creation module is replenished.

27. The method of claim 15 wherein through the REST architectural style, settings on the user's side are changed at any time without affecting the system's operation, in which different users get to the same REST endpoints with the ability to perform the same actions and get the same responses from the system.

28. The method of claim 15 wherein all information is stored in the data server modularly and separately.

29. The method of claim 15 wherein the system modules interact asynchronously through the use of the RabbitMQ message broker, in which within the server the concept of event-receiving nodes (exchanges) is realized which route data to different queues of RabbitMQ messages.

30. The method of claim 15 wherein data is stored and extracted from the data server within the system by means of the GridFS MongoDB file storage with the ability to store divide data into fragment and save each data fragment separately.

* * * * *